United States Patent
Derakhshani et al.

(10) Patent No.: US 10,095,927 B2
(45) Date of Patent: *Oct. 9, 2018

(54) QUALITY METRICS FOR BIOMETRIC AUTHENTICATION

(71) Applicant: EyeVerify LLC, Kansas City, KS (US)

(72) Inventors: Reza R. Derakhshani, Shawnee, KS (US); Vikas Gottemukkula, Kansas City, MO (US)

(73) Assignee: Eye Verify LLC, Kansas City, MO (US)

( * ) Notice: Subject to any disclaimer, the term of this patent is extended or adjusted under 35 U.S.C. 154(b) by 94 days.

This patent is subject to a terminal disclaimer.

(21) Appl. No.: 15/142,774

(22) Filed: Apr. 29, 2016

(65) Prior Publication Data
US 2017/0032184 A1 Feb. 2, 2017

Related U.S. Application Data

(63) Continuation of application No. 14/270,925, filed on May 6, 2014, now Pat. No. 9,361,681, which is a
(Continued)

(51) Int. Cl.
*G06K 9/00* (2006.01)
*G06K 9/03* (2006.01)
(Continued)

(52) U.S. Cl.
CPC ....... *G06K 9/00617* (2013.01); *G06K 9/0061* (2013.01); *G06K 9/00597* (2013.01);
(Continued)

(58) Field of Classification Search
CPC .......... G06K 9/00617; G06K 9/00597; G06K 9/00604; G06K 9/0061; G06K 9/036;
(Continued)

(56) References Cited

U.S. PATENT DOCUMENTS

| 5,141,303 A | * | 8/1992 | Yamamoto | ........... A61B 3/1233 351/211 |
|---|---|---|---|---|
| 5,291,560 A | | 3/1994 | Daugman | |

(Continued)

FOREIGN PATENT DOCUMENTS

| CN | 1897042 A | 1/2007 |
|---|---|---|
| CN | 101334916 A | 12/2008 |

(Continued)

OTHER PUBLICATIONS

U.S. Appl. No. 14/270,925, filed May 6, 2014, Quality Metrics for Biometric Authentication, Derakhshani et al.
(Continued)

*Primary Examiner* — Jonathan S Lee
(74) *Attorney, Agent, or Firm* — Goodwin Procter LLP

(57) ABSTRACT

This specification describes technologies relating to biometric authentication based on images of the eye. In general, one aspect of the subject matter described in this specification can be embodied in methods that include obtaining a first image of an eye including a view of the white of the eye. The method may further include determining metrics for the first image, including a first metric for reflecting an extent of one or more connected structures in the first image that represents a morphology of eye vasculature and a second metric for comparing the extent of eye vasculature detected across different color components in the first image. A quality score may be determined based on the metrics for the first image. The first image may be rejected or accepted based on the quality score.

27 Claims, 9 Drawing Sheets

Related U.S. Application Data continuation of application No. 13/912,032, filed on Jun. 6, 2013, now Pat. No. 8,724,857, which is a continuation of application No. 13/572,267, filed on Aug. 10, 2012, now Pat. No. 8,483,450.

(51) Int. Cl.
  *G06T 7/00*    (2017.01)
  *G06K 9/46*    (2006.01)
  *G06K 9/62*    (2006.01)

(52) U.S. Cl.
  CPC .......... *G06K 9/00604* (2013.01); *G06K 9/036* (2013.01); *G06K 9/4652* (2013.01); *G06K 9/623* (2013.01); *G06T 7/0002* (2013.01); *G06K 2009/00932* (2013.01); *G06T 2207/20041* (2013.01); *G06T 2207/20112* (2013.01); *G06T 2207/30168* (2013.01)

(58) Field of Classification Search
  CPC ................. G06K 9/4652; G06K 9/623; G06K 2009/00932; A61B 5/117; G06T 7/0002; G06T 2207/20041; G06T 2207/20112; G06T 2207/30168
  See application file for complete search history.

(56) References Cited

U.S. PATENT DOCUMENTS

| | | | |
|---|---|---|---|
| 6,569,104 B2 * | 5/2003 | Ono | A61B 3/1233 600/476 |
| 7,031,539 B2 | 4/2006 | Tisse et al. | |
| 7,327,860 B2 | 2/2008 | Derakhshani et al. | |
| 7,336,806 B2 | 2/2008 | Schonberg et al. | |
| 7,542,590 B1 | 6/2009 | Robinson et al. | |
| 7,668,351 B1 | 2/2010 | Soliz et al. | |
| 8,079,711 B2 | 12/2011 | Stetson et al. | |
| 8,251,511 B2 | 8/2012 | Stetson et al. | |
| 8,279,329 B2 | 10/2012 | Shroff et al. | |
| 8,369,595 B1 | 2/2013 | Derakhshani et al. | |
| 8,483,450 B1 | 7/2013 | Derakhshani et al. | |
| 8,724,857 B2 | 5/2014 | Derakhshani et al. | |
| 2005/0119642 A1 * | 6/2005 | Grecu | A61B 3/113 606/5 |
| 2005/0281440 A1 | 12/2005 | Pemer | |
| 2005/0286801 A1 | 12/2005 | Nikiforov | |
| 2006/0058682 A1 | 3/2006 | Miller et al. | |
| 2006/0110011 A1 | 5/2006 | Cohen et al. | |
| 2006/0132790 A1 | 6/2006 | Gutiin | |
| 2006/0140460 A1 | 6/2006 | Coutts | |
| 2006/0280340 A1 | 12/2006 | Derakhshani et al. | |
| 2006/0288234 A1 | 12/2006 | Azar et al. | |
| 2007/0286462 A1 | 12/2007 | Usher et al. | |
| 2007/0291277 A1 | 12/2007 | Everett et al. | |
| 2008/0025574 A1 | 1/2008 | Morikawa et al. | |
| 2009/0136100 A1 | 5/2009 | Shinohara | |
| 2010/0128117 A1 | 5/2010 | Dyer | |
| 2010/0142765 A1 | 6/2010 | Hamza | |
| 2010/0142767 A1 | 6/2010 | Fleming | |
| 2010/0271471 A1 | 10/2010 | Kawasaki et al. | |
| 2011/0019150 A1 * | 1/2011 | Schuhrke | A61B 3/111 351/206 |
| 2011/0033091 A1 | 2/2011 | Fujii et al. | |
| 2011/0058712 A1 | 3/2011 | Sanchez Ramos | |
| 2012/0163678 A1 | 6/2012 | Du et al. | |
| 2014/0079296 A1 * | 3/2014 | Cleland | G06F 21/32 382/117 |
| 2014/0294235 A1 * | 10/2014 | Ishida | G06K 9/0061 382/103 |
| 2018/0012007 A1 * | 1/2018 | Kim | G06F 21/32 |
| 2018/0096119 A1 * | 4/2018 | Yun | G06F 21/32 |

FOREIGN PATENT DOCUMENTS

| | | |
|---|---|---|
| GB | 2465881 A | 6/2010 |
| GB | 2471192 A | 12/2010 |
| WO | WO-2007/127157 A2 | 11/2007 |

OTHER PUBLICATIONS

U.S. Appl. No. 13/572,267 (now U.S. Pat. No. 8,483,450), the Notices of Allowance dated Nov. 5, 2012 and Apr. 15, 2013.

U.S. Appl. No. 13/912,032 (now U.S. Pat. No. 8,724,857), the Office Action dated Oct. 24, 2013 and Notice of Allowance dated Mar. 24, 2014.

U.S. Appl. No. 14/270,925, the Office Actions dated Jul. 29, 2014, Dec. 31, 2014 and Jul. 6, 2015, and Notice of Allowance dated Mar. 14, 2016.

Bowyer, K.W., et al., "Image Understanding for Iris Biometrics: A Survey," Computer Vision and Image Understanding; 110(2):281-307; May 2008.

Bowyer, K.W., et al., "A Survey of Iris Biometrics Research: 2008-2010," Handbook of Iris Recognition 2013; pp. 15-54; Jan. 2013.

Cesar Jr. and Costa, "Neurcal Cell Classification by Wavelets and Multiscale Curvature," Biol Cybern; 79:347-360; Oct. 1998.

Chen, Z., et al., "A Texture-Based Method for Classifying Cracked Concrete Surfaces From Digital Images Using Neural Networks," Proc.of Int'l Joint Conference on Neural Networks, IEEE, San Jose, CA; pp. 2632-2637; Jul. 31-Aug. 5, 2011.

Choras, R.S., "Ocular Biometrics-Automatic Feature Extraction From Eye Images," Recent Res. in Telecommunications, Informatics, Electronics and Signal Processing; pp. 179-183; May 2011.

Clausi, D.A. and Jernigan, M.E., "Designing Gabor Filters for Optimal Texture Separability," Pattern Recog; 33(11):1835-1849; Nov. 2000.

CN201310275046.X; Offical Action and Search Report (Translated) dated Mar. 23, 2016; 14pgs.

Costa, L.d.F. and Cesar Jr, R.M., "Shape Analysis and Classification: Theory and Practice," CRC Press; pp. 608-615; Dec. 2000.

Crihalmeanu, S., et al., "Enhancement and Registration Schemes for Matching Conjunctival Vasculature," Proc. of the 3rd IAPR/IEEE International Conference on Biometrics (ICB), Alghero, Italy; pp. 1247-1256; Jun. 2009.

Crihalmeanu, S. and Ross, A., "Multispectral Scleral Patterns for Ocular Biometric Recognition," Pattern Recognition Lett; 33(14):1860-1869; Oct. 2012.

Derakhshani, R.R., et al., "A New Biometric Modality Based on Conjunctival Vasculature," Proc. of the Artificial Neural Networks in Engineering Conference (Annie), St. Louis, MO; pp. 497-504, Nov. 2006.

Derakhshani, R.R., et al., "A Texture-Based Neural Network Classifier for Biometric Identification Using Ocular Surface Vasculature," Proceedings of International Joint Conference on Neural Networks (IJCNN), Orlando, FL; 6pgs.; Aug. 2007.

Derakhshani, et al., "A Vessel Tracing Algorithm for Human Conjunctival Vasculature," Abstract in Proc. of the Kansas City Life Sciences Institute Research Day Conference, Kansas City, MO; p. 150; Mar. 2006.

Derakhshani, et al., "Computational Methods for Objective Assessment of Conjunctival Vascularity," Engineering in Medicine and Biology Society (EMBC), Proc.of the 2012 IEEE Engineering in Medicine and Biology Conference, San Diego, CA; 4pgs; Aug. 28-Sep. 1, 2012.

Gottemukkula, V., et al., "A Texture-Based Method for Identification of Retinal Vasculature," 2011 IEEE International Conference on Technologies for Homeland Security, Waltham, MA; pp. 434-439; Nov. 15-17, 2011.

Gottemukkula, V., et al., "Fusing Iris and Conjunctival Vasculature: Ocular Biometrics in the Visible Spectrum," 2012 IEEE Conf. on Technologies for Homeland Security (HST); pp. 150-155; Nov. 13-15, 2012.

(56) References Cited

OTHER PUBLICATIONS

Grigorescu, S.E., et al., "Comparison of Texture Features Based on Gabor Filters," IEEE Transactions on Image Processing; 11(10):1160-1167; Oct. 2002.
http://appbank.us/healthcare/pulse-phone-put-your-finger-against-the-camer-a-to-check-your-pulse-check-your-pulse-every-day-and-keep-control-of-your-health, accessed Aug. 8, 2012.
Int'l Search Report and Written Opinion of the ISA/EP in PCT/US2013/043901; 11 pgs.; Aug. 22, 2013.
Jung, E. and Hong, K. "Automatic Retinal Vasculature Structure Tracing and Vascular Landmark Extraction from Human Eye Image," ICHIT '06. Int'l Conf. on Hybrid Information Technology, 2006; vol. 2; pp. 161-167; Nov. 9-11, 2006.
Kalka, N.D., et al. "Estimating and Fusing Quality Factors for Iris Biometric Images," IEEE Transactions on Systems, Man and Cybernetics, Part A: Systems and Humans; 40(3):509-524; May 2010.
Kirbas, C. and Quek, F.K.H., "Vessel Extraction Techniques and Algorithms: A Survey," Proc. of the Third IEEE Symposium on Bioinformatics and Bioengineering, Computer Society, Bethesda, MD; 8pgs; Mar. 10-12, 2003.
Kollreider, K., et al., "Verifying Liveness by Multiple Experts in Face Biometrics," IEEE Comp Soc Conf. on Computer Vision and Pattern Recognition Workshops, Anchorage, AK; pp. 1-6; Jun. 24-26, 2008.
Kumar, A. and Passi, A., "Comparison and Combination of Iris Matchers for Reliable Personal Authentication," Pattern Recognition; 43:1016-1026; Mar. 2010.
Li, H. and Chutatape, O., "Automated Feature Extraction in Color Retinal Images by a Model Based Approach," IEEE Transactions on Biomed Eng; 51(2):246-254; Feb. 2004.
Liu, Z., et al., "Finger Vein Recognition With Manifold Learning," J Network and Computer Appl; 33(3):275-282; May 2010.
Liu, C., et al., "Gabor Feature Based Classification Using the Enhanced Fisher Linear Discriminant Model for Face Recognition," IEEE Transactions on Image Processing; 11(4):467-476; Apr. 2002.
Nandakumar, K., et al., "Quality-based Score Level Fusion in Multibiometric Systems," The 18th Int'l Conference on Pattern Recognition; pp. 1-4; Aug. 20-24, 2006.
Owen, C.G., et al., "Optimal Green (Red-free) Digital Imaging of Conjunctival Vasculature," Opthal Physiol Opt; 22(3):234-243; May 2002.
Proenca, H., "Quality Assessment of Degraded Iris Images Acquired in the Visible Wavelength," IEEE Transactions on Information Forensics and Security; 6(1):82-95; Mar. 2011.
Randen, T. and Husøoy, J.H., "Filtering for Texture Classification: A Comparative Study," IEEE Transactions on Pattern Analysis and Machine Intell.; 21(4):291-310; Apr. 1999.
Saad, M.A., et al., "Model-Based Blind Image Quality Assessment Using Natural DCT Statistics," IEEE Transactions on Image Processing; X(X):1-12; Dec. 2010.
Schwartz, G. and Berry, M.J., "Sophisticated Temporal Pattern Recognition in Retinal Ganglion Cells," J Neurophysiol; 99(4):1787-1798; Feb. 2008.
Sun, Z., et al., "Improving Iris Recognition Accuracy Via Cascaded Classifiers," IEEE Transactions on Systems, Man, and Cybernetics—Part C: Applications and Reviews; 35(3):435-441; Aug. 2005.
Tanaka, T. and Kubo, N., "Biometric Authentication by Hand Vein Patterns," Soc. of Instrument and Control Engineers (SICE) Annual Conference, Sapporo, Japan; pp. 249-253; Aug. 4-6, 2004.
Tanaka, H., et al.; Texture Segmentation Using Amplitude and Phase Information of Gabor Filters, Elec. Comm. in Japan, Part. 3; 87(4):66-79; Apr. 2004.
Tankasala, S.P., et al., "Biometric Recognition of Conjunctival Vasculature Using GLCM Features," 2011 Int'l Conference on Image Information Processing (ICIIP), Waknaghat, India; 6pgs; Nov. 3-5, 2011.
Tankasala, S.P. et al., "Classification of Conjunctival Vasculature Using GLCM Features," 2011 Int'l Conference on Image Information Processing (ICIIP), Waknaghat, India; 6pgs; Nov. 2011.
Tankasala, S.P., et al., "Visible Light, Bi-Modal Ocular Biometrics," Proc. of the 2012 2nd International Conference on Communication Computing and Security (ICCCS), Rourkela, India; 9pgs; Oct. 6-8, 2012.
Thomas, N.L. et al., "A New Approach for Sclera Vein Recognition," Proc. SPIE 7708, Mobile Multimedia/Image Processing, Security, and Applications 2010; 7708(1):1-10; Apr. 2010.
Toth, B., "Liveness Detection: Iris," Encyclo. Biometrics; 2:931-938; Jan. 2009.
Ulery, B., et al., "Studies of Biometric Fusion," US Department of Commerce, National Institute of Standards and Technology (NIST); pp. 1-22, Sep. 2006.
Wu, C. and Harada, K., "Extraction and Digitization Method of Blood Vessel in Scleraconjunctiva Image," Int'l J Computer Sci and Network Security; 11(7):113-118; Jul. 2011.
Zhou, Z., et al., "A Comprehensive Sclera Image Quality Measure," 2010 11th Int'l. Conf. Control, Automation, Robotics and Vision (ICARCV), Singapore; pp. 638-643; Dec. 7-10, 2010.
Zhou, Z., et al., "A New Human Identification Method: Sclera Recognition," IEEE Transactions on Systems, Man, and Cybernetics Part A: Systems and Humans; 42(3):571-583; May 2012.
Zhou, Z. et al., "Multi-angle Sclera Recognition System," 2011 IEEE Workshop on Computational Intelligencein Biometrics and Identity Management (CIBIM), Paris; 6pgs; Apr. 11, 2011.
Zhou, Z., et al., "Multimodal Eye Recognition," Mobile Multimedia/Image Processing, Security, and Applications 2010; 7708:1-10; Apr. 2010.

\* cited by examiner

QUALITY METRICS FOR BIOMETRIC AUTHENTICATION

CROSS REFERENCE TO RELATED APPLICATIONS

This application is a continuation of, and claims priority to, pending U.S. patent application Ser. No. 14/270,925, filed on May 6, 2014, and entitled "Quality Metrics for Biometric Authentication," which is a continuation of, and claims priority to, U.S. Pat. No. 8,724,857, filed on Jun. 6, 2013 and issued May 13, 2014, and entitled "Quality Metrics for Biometric Authentication," which is a continuation of, and claims priority to, U.S. Pat. No. 8,483,450, filed on Aug. 10, 2012 and issued Jul. 9, 2013, and entitled "Quality Metrics for Biometric Authentication," the entireties of which are incorporated herein by reference.

TECHNICAL FIELD

The present disclosure relates to biometric authentication based on images of the eye.

BACKGROUND

It is often desirable to restrict access to property or resources to particular individuals. Biometric systems may be used to authenticate the identity of an individual to either grant or deny access to a resource. For example, iris scanners may be used by a biometric security system to identify an individual based on unique structures in the individual's iris.

SUMMARY

This specification describes technologies relating to biometric authentication based on images of the eye. In general, one aspect of the subject matter described in this specification can be embodied in a method that includes obtaining a first image of an eye, wherein the first image includes a view of a portion of a vasculature of the eye external to a corneal limbus boundary of the eye. The method may further include determining a plurality of metrics for the first image, wherein the metrics include a first metric for reflecting an extent of one or more connected structures in the first image that represents a morphology of eye vasculature and a second metric for comparing the extent of eye vasculature detected across different color components in the first image. The method may further include determining a quality score based on, at least, the plurality of metrics for the first image. The quality score may be a prediction of a match score that would be determined based on the first image and a second image, assuming the first image and the second image included a view of the same person's vasculature. The method may further include rejecting or accepting the first image based on the quality score.

In general, one aspect of the subject matter described in this specification can be embodied in a system that includes a sensor configured to obtain a first image of an eye, wherein the first image includes a view of a portion of a vasculature of the eye external to a corneal limbus boundary of the eye. The system may further include a means for determining a plurality of metrics for the first image, wherein the metrics include a first metric for reflecting an extent of one or more connected structures in the first image that represents a morphology of eye vasculature and a second metric for comparing the extent of eye vasculature detected across different color components in the first image. The system may further include a module configured to determine a quality score based on, at least, the plurality of metrics for the first image. The quality score may be a prediction of a match score that would be determined based on the first image and a second image, assuming the first image and the second image included a view of the same person's vasculature. The system may further include a module configured to reject or accept the first image based on the quality score.

In general, one aspect of the subject matter described in this specification can be embodied in a system that includes a data processing apparatus and a memory coupled to the data processing apparatus. The memory having instructions stored thereon which, when executed by the data processing apparatus cause the data processing apparatus to perform operations including obtaining a first image of an eye, wherein the first image includes a view of a portion of a vasculature of the eye external to a corneal limbus boundary of the eye. The operations may further include determining a plurality of metrics for the first image, wherein the metrics include a first metric for reflecting an extent of one or more connected structures in the first image that represents a morphology of eye vasculature and a second metric for comparing the extent of eye vasculature detected across different color components in the first image. The operations may further include determining a quality score based on, at least, the plurality of metrics for the first image. The quality score may be a prediction of a match score that would be determined based on the first image and a second image, assuming the first image and the second image included a view of the same person's vasculature. The operations may further include rejecting or accepting the first image based on the quality score.

In general, one aspect of the subject matter described in this specification can be embodied in a non-transitory computer readable media storing software including instructions executable by a processing device that upon such execution cause the processing device to perform operations that include obtaining a first image of an eye, wherein the first image includes a view of a portion of a vasculature of the eye external to a corneal limbus boundary of the eye. The operations may further include determining a plurality of metrics for the first image, wherein the metrics include a first metric for reflecting an extent of one or more connected structures in the first image that represents a morphology of eye vasculature and a second metric for comparing the extent of eye vasculature detected across different color components in the first image. The operations may further include determining a quality score based on, at least, the plurality of metrics for the first image. The quality score may be a prediction of a match score that would be determined based on the first image and a second image, assuming the first image and the second image included a view of the same person's vasculature. The operations may further include rejecting or accepting the first image based on the quality score.

These and other embodiments can each optionally include one or more of the following features. Determining the first metric may include dilating the vasculature in the first image so that one or more disconnected veins in the vasculature become connected, thinning the dilated vasculature in the first image, and determining a portion of the first image that contains the thinned dilated vasculature. Determining the second metric may include determining a first color difference signal by subtracting a first color component of the first image from a second color component of the first image, determining a second color difference signal by subtracting a third color component of the first image from the first color component of the first image, and determining a ratio of a first standard deviation of the first color difference signal to a second standard deviation of the second color difference signal. The plurality of metrics may include a third metric reflecting image clarity based on one or more of the following measures for the first image: contrast, defocus, motion blur, exposure, dynamic range, and chromatic differences. The plurality of metrics may include a third metric based on an amount of glare in the first image. The plurality of metrics may include a third metric based on a number and types of occlusions in the first image. The plurality of metrics may include a third metric based on the amount of specular reflection in the first image. The plurality of metrics may include a third metric based on a degree to which an eyelid depicted in the first image is closed. The plurality of metrics may include a third metric based on a gaze angle of an eye depicted in the first image. The plurality of metrics may include a third metric based on the segmentation quality of a sclera depicted in the first image. Determining the quality score may include using a trained function approximator to generate the prediction. A match score may be determined by combining, based in part on the quality score, a plurality of match scores, including at least one match score based on the first image. Feedback based on the quality score may be provided to a user. A match score may be determined based on, at least, the first image and data from a reference record that reflects a reference image. A user may be accepted based in part on the match score. The quality score may be compared to a previous quality score stored in the reference record and the reference record may be updated with data based on the first image when the quality score is better than the previous quality score.

Particular embodiments of the invention can be implemented to realize none, one or more of the following advantages. Some implementations can provide security by reliably authenticating individuals. Some implementations can reduce false rejection rates for an authentication system. Some implementations can reduce the likelihood that processing time and resources will be wasted calculating match scores for low quality images. Some implementations can facilitate the gathering of superior image data during authentication sessions to supplement or enhance reference records for an authenticated individual. Some implementations can provide user feedback to facilitate the capture of high quality images for authentication.

The details of one or more embodiments of the invention are set forth in the accompanying drawings and the description below. Other features, aspects, and advantages of the invention will become apparent from the description, the drawings, and the claims.

DETAILED DESCRIPTION

Distinctive features of an individual's visible vasculature in the whites of the eyes can be used to identify or authenticate the individual. The analysis required to authenticate a user based on images of the white of their eye can be sensitive to image degradation from a variety of sources (e.g., poor lighting; lack of focus; excessive motion during image capture, occlusion by eye lashes or eyelids, etc.). In some cases, the analysis required to authenticate can be complex and slow. It can be more efficient to avoid wasting time and resources analyzing a poor quality image that is unlikely to result in a proper authentication. In some implementations, one or more quality metrics can be determined and used to assess the likelihood that an image will be able to provide a successful authentication of an individual. In some implementations, image data can be passed to a trained function approximator to estimate the likelihood of a proper authentication result based on the image.

If the likelihood of a proper authentication is determined to be sufficiently high, the image can be accepted and analyzed to determine whether a user matches a reference record. If the likelihood of a proper authentication is determined to be too low, the image can be rejected and further unnecessary processing can be avoided. In some implementations, a user can be alerted to the quality problem with the submitted image and provided with information about the problem to facilitate the acquisition of a better image.

In some implementations, quality metrics used to assess image quality reflect the extent of the vasculature that is visible in an image. In some implementations, quality metrics used to assess image compare the extent of eye vasculature detected across different color components. In some implementations, quality metrics used to assess image quality reflect the clarity of an image (e.g., contrast, defocus, motion blur, exposure, dynamic range, and chromatic differences). In some implementations, quality metrics used to assess image quality reflect level of other types of distortions of the vasculature in the image (e.g., amount of glare, degree of eyelid opening, gaze angle of the eye, amount of specular reflection, sclera segmentation quality, and number and types of occlusions).

In some implementations, a plurality of quality metrics can be combined to determine a quality score that reflects the likelihood that a positive authentication would result from the image, assuming that the image the user is in fact the person they claim to be. For example, a trained function approximator (e.g., a neural network) can be used to determine, based on a plurality of quality metrics, a prediction of a match score that would be determined based on the current image and a reference or enrollment image, assuming the current image and the reference image included a view of the same vasculature.

Figure 1:
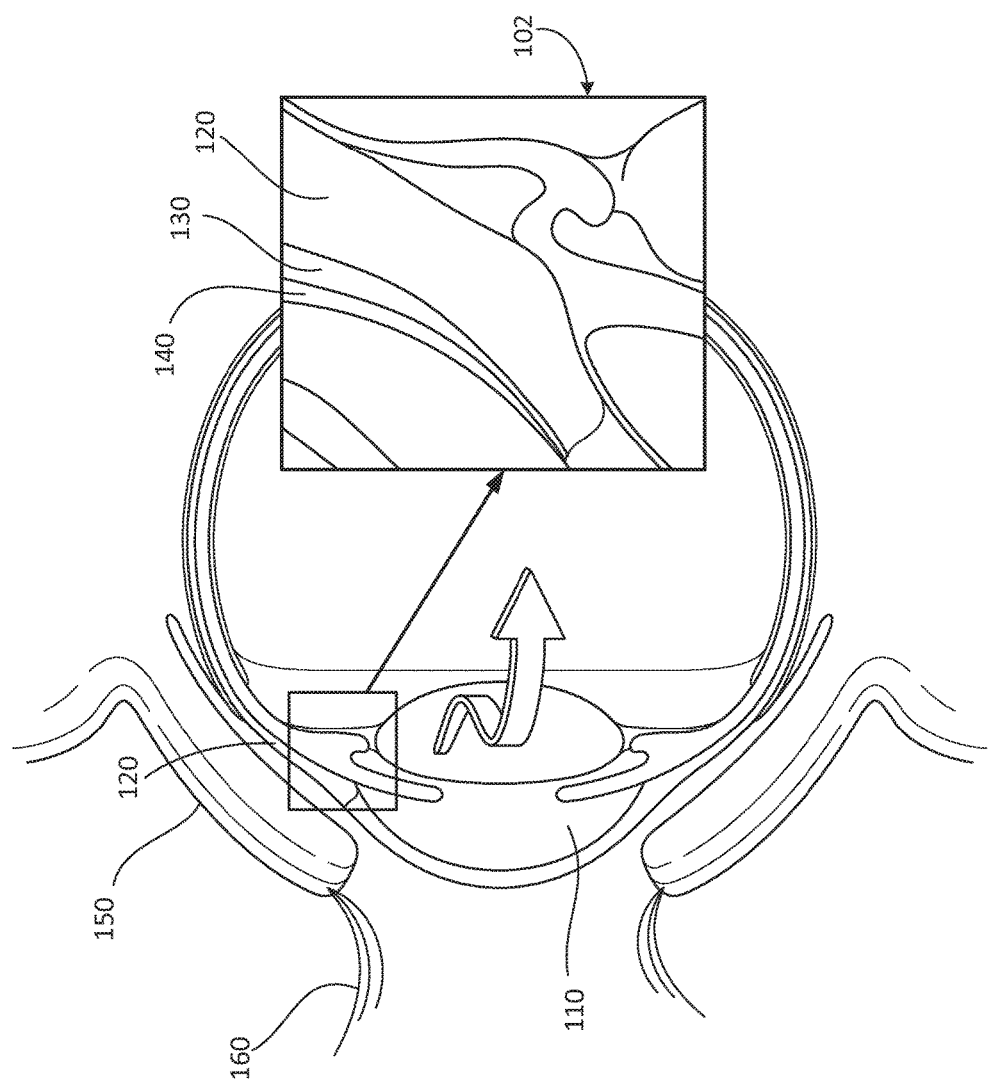
FIG. 1 is a diagram of the anatomy of a human eye.

FIG. 1 is a diagram of the anatomy of a human eye 100. The diagram is a cross-section of the eye with a blowup 102 of the anatomy near the corneal limbus boundary of the eye that separates the colored iris 110 from the surrounding white of the eye. The white of the eye includes a complex vascular structure which is not only readily visible and scannable from outside of the eye, but in addition that vascular structure is unique and varies between individuals. Thus, these vascular structures of the white of the eye, mostly due to vasculature of conjunctiva and episclera, can be scanned and advantageously used as a biometric. This biometric can be used to authenticate a particular individual, or, identify an unknown individual.

The white of the eye has a number of layers. The sclera 120 is an opaque, fibrous, protective, layer of the eye containing collagen and elastic fiber. The sclera 120 is covered by the episclera 130, which has a particularly large number of blood vessels and veins that that run through and over it. The episclera 130 is covered by the bulbar conjunctiva 140, which is a thin clear membrane that interfaces with the eyelid 150 or the environment when the eyelid is opened. Blood vessels and veins run through all of these layers of the white of the eye and can be detected in images of the eye. The eye also includes eyelashes 160 that can sometimes obscure portions of the white of the eye in an image.

Figure 2:
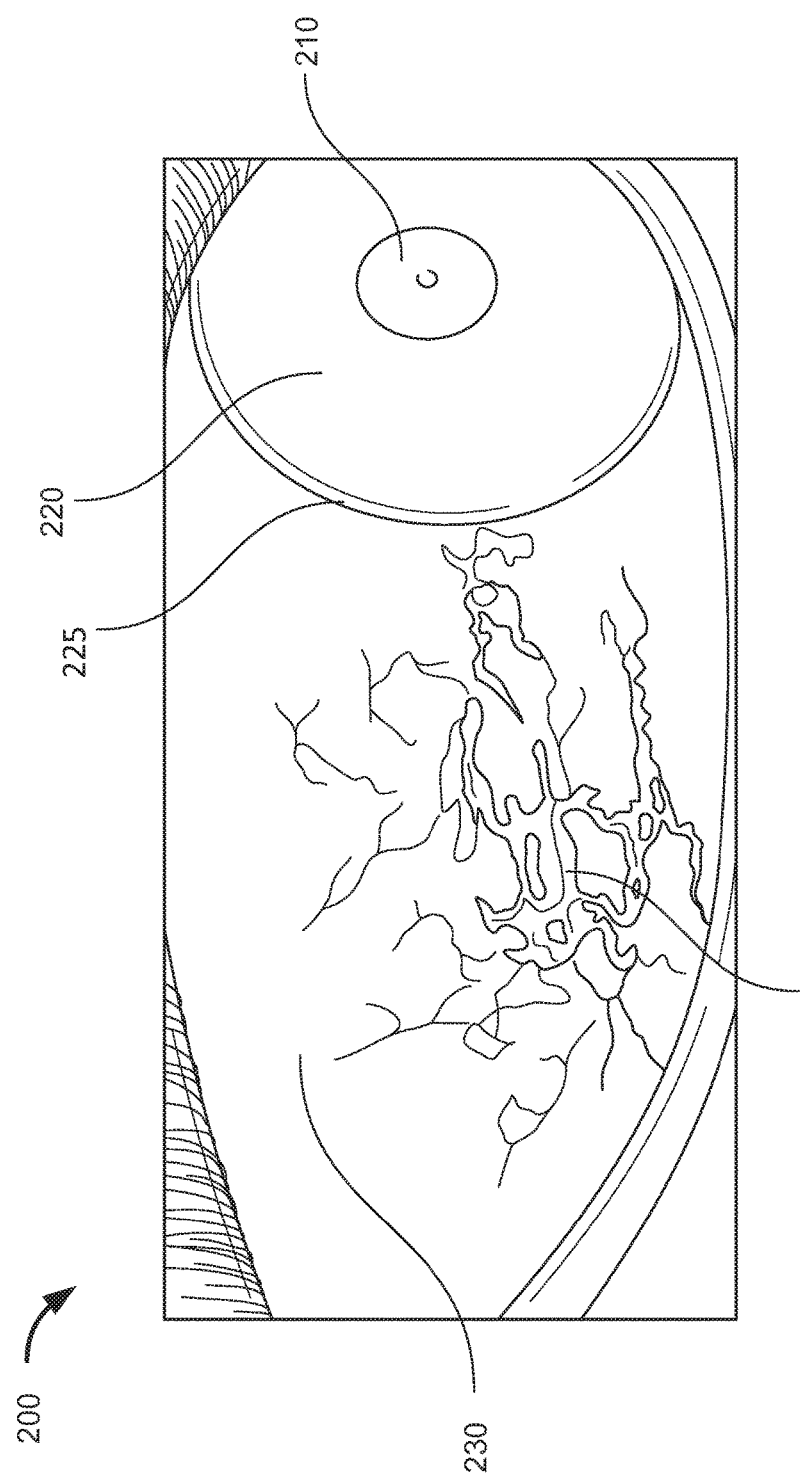
FIG. 2 is a diagram of an example image including portions showing vasculature of the white of an eye.

FIG. 2 is a diagram of an example image 200 including portions showing vasculature of the white of an eye. Such an image 200 can be captured with a sensor (e.g., a camera) that is integrated into a computing device such as, for example, a smart phone, a tablet computer, a television, a laptop computer, or a personal computer. For example, a user can be prompted through a display or audio prompt to look to the left while the image is captured, thus exposing a larger area of the white of the eye to the right of the iris to the view of the sensor. Similarly, a user may be prompted to look right, up, down, straight, etc. while an image is captured. The example image includes a view of an iris 220 with a pupil 210 at its center. The iris 220 extends to the corneal limbus boundary 225 of the eye. The white 230 of the eye is external to a corneal limbus boundary 225 of the eye. An extensive vasculature 240 of the white of the eye is visible in the image 100. This vasculature 240 can be distinctive for an individual. In some implementations, distinctive features of the vasculature 240 can be used as a basis for identifying, verifying, or authenticating an individual user.

Figure 3:
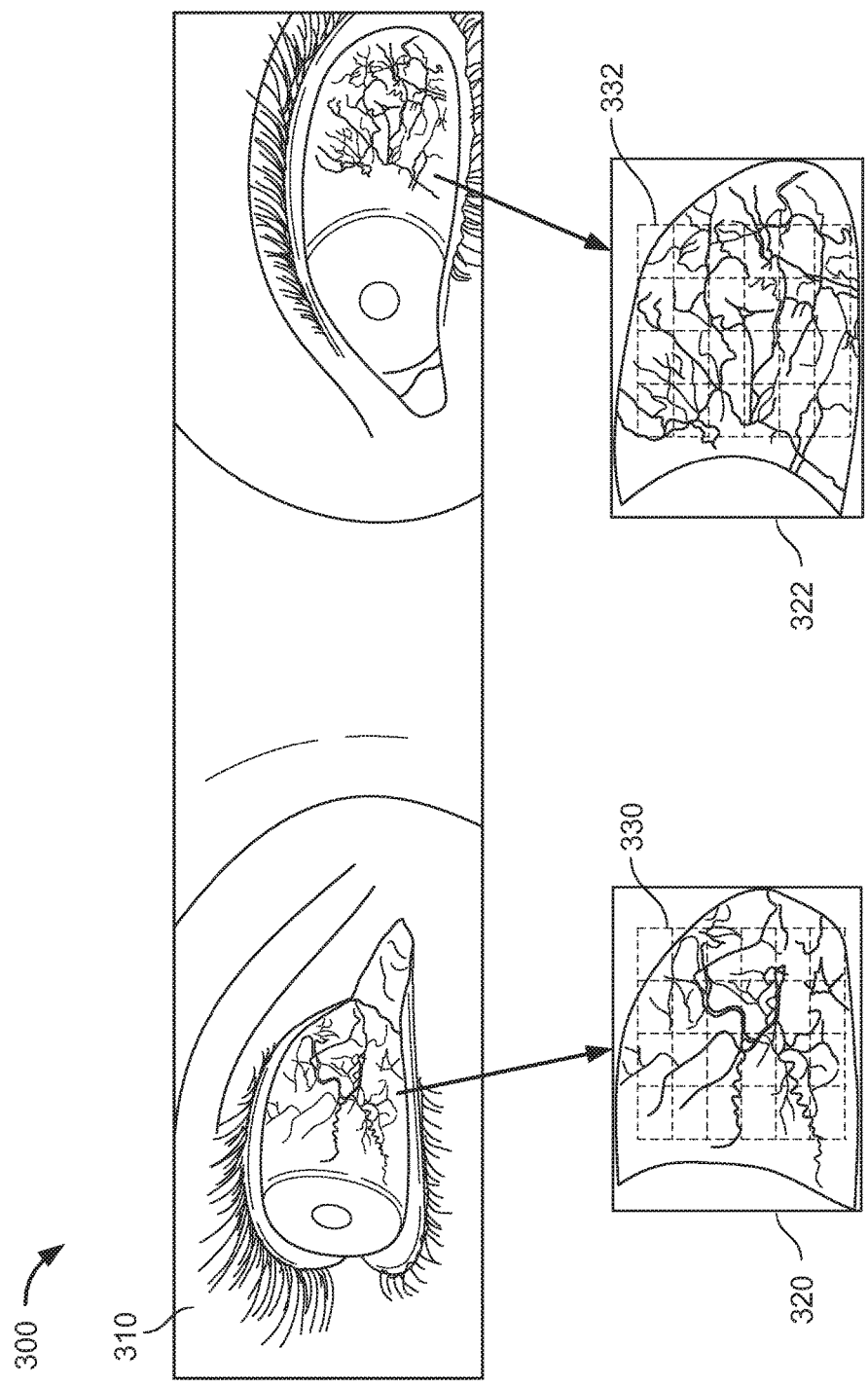
FIG. 3 is a diagram of an example image that is segmented for analysis.

FIG. 3 is a diagram of an example image 300, including portions showing vasculature of the whites of two eyes, that is segmented for analysis. A captured image 310 can be obtained in a variety of ways. The captured image 310 can be preprocessed and segmented to isolate regions of interest within the image and enhance the view of vasculature in the whites of the eyes. For example, the regions of interest can be tiled portions that form grids covering some or all the whites of the eyes. A portion 320 of the corresponding to the white of the right eye left of the iris can be isolated, for example, by identifying the corneal limbus boundary and the edges of the eyelids. Similarly, a portion 322 corresponding to the white of the left eye left of the iris can be isolated. Preprocessing can be used to enhance the view of the vasculature in this region, for example, by selecting a component color from the image data that maximizes the contrast between the vasculature and the surrounding white portions of the whites of the eyes. In some implementations, these portions 320, 322 of the image can be further segmented into tiles forming grids 330, 332 that divide an exposed surface area of the whites of the eyes into smaller regions for analysis purposes. Features of the vasculature in these regions of interest can be used for identification or authentication of an individual.

Figure 4:
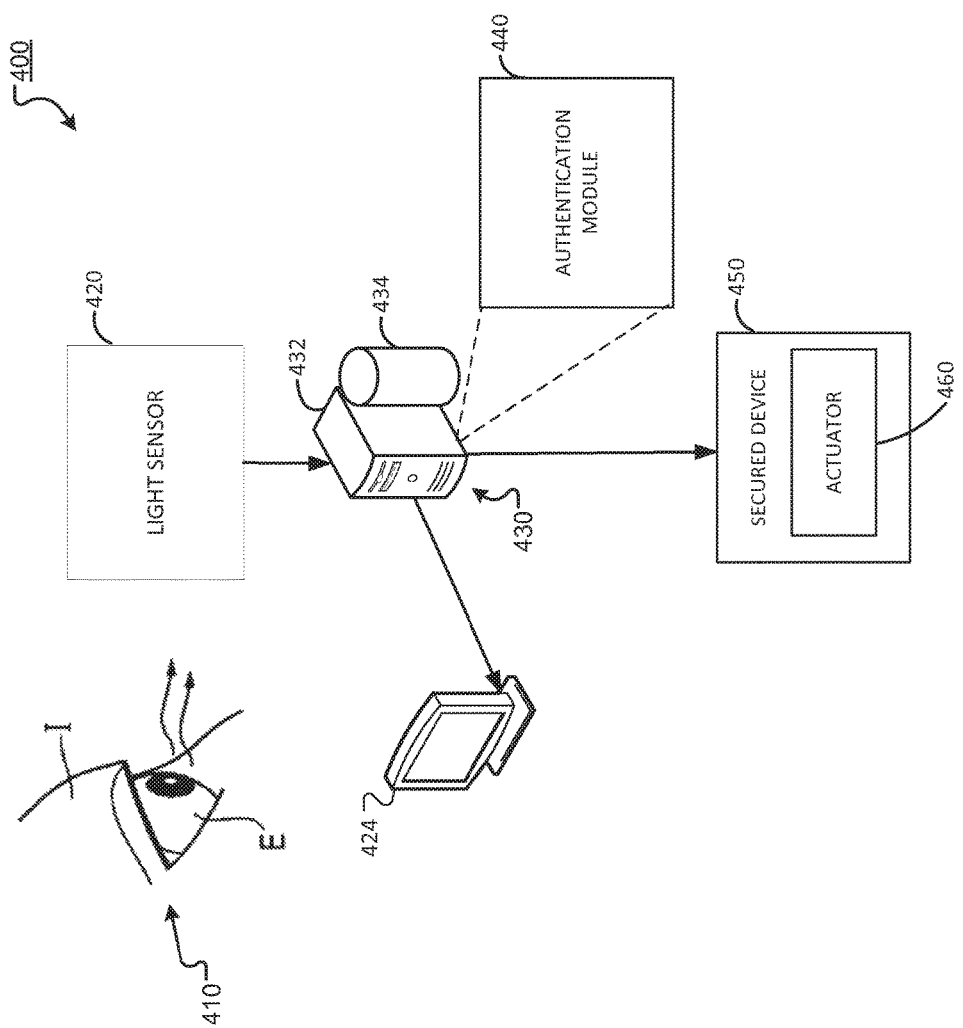
FIG. 4 is a block diagram of example security system that is configured to authenticate an individual based in part on one or more images of the white of an eye.

FIG. 4 is a block diagram of example security system 400 that is configured to authenticate an individual based in part on one or more images of the white of an eye 410. A user of the security system 400 can present their eye 410 to a light sensor 420. In this manner one or more images of the white of the eye 410 can be captured. A digital camera, a three-dimensional (3D) camera, and a light field sensor are examples of light sensors that can be employed. The light sensor 420 can employ a variety of technologies, e.g., digital charge-coupled devices (CCD) or complementary metal-oxide-semiconductors (CMOS). In some implementations, the user can be prompted via messages shown on display 424 to make certain poses to expose portions of the white of the eye 410 and facilitate image acquisition. For example, the user can be prompted to direct their gaze in order to roll the iris of their eye 410 left, right, up, up-left, and roll up-right. In some implementations, not shown, the user can be prompted to assume poses though messages played through a speaker, through indicator lights (e.g. LEDs), or not prompted at all.

In some implementations, the sensor 420 can be configured to detect when the eye 410 has been properly positioned in the field of view of the sensor. Alternatively, software or firmware implemented on a computing device 430 can analyze one or more images produced by the light sensor 420 to determine whether the eye 410 has been properly positioned. In some implementations, the user can manually indicate when the eye 410 is properly positioned through a user interface (e.g., button, keyboard, keypad, touchpad, or touch screen).

An authentication module 440 implemented on the computing device 430 can obtain one or more images of the white of the eye through the light sensor 420. In some implementations, the computing device 430 is integrated with or electronically coupled to the light sensor 420. In some implementations, the computing device 430 can communicate with the light sensor 420 through a wireless interface (e.g., an antenna).

The authentication module 440 processes images obtained through the light sensor 420 to control access to a secured device 450. For example, the authentication module 440 can implement authentication processes described in relation to FIG. 6. In some implementations, the secured device 450 can include an actuator 460 (e.g., a locking mechanism) that affects the access control instructions from the authentication module 440.

The computing device can be integrated with or interface with the secured device 450 in a variety of ways. For example, the secured device 450 can be an automobile, the light sensor 420 can be a camera integrated in the steering wheel or dashboard of the automobile, and the computing device 430 can be integrated in the automobile and electrically connected to the camera and an ignition locking system that serves as the security actuator 460. A user can present views of the whites of their eye to the camera in order to be authenticated as an authorized driver of the automobile and start the engine.

In some implementations, the secured device 450 can be a real estate lock box, the light sensor 420 can be a camera integrated with the user's mobile device (e.g., a smartphone or tablet device), and the processing of the authentication module 440 can be performed in part by the user's mobile device and in part by a computing device integrated with the lock box that controls a power locking mechanism. The two computing devices can communicate through a wireless interface. For example, the user (e.g., a realtor giving a showing of a property) can use the camera on their mobile device to obtain one or more images and submit data based on the images to the lock box in order to be authenticated as authorized user and granted access to keys stored in the lock box.

In some implementations, the secured device 450 is a gate or door that controls access to a property. The light sensor 420 can be integrated in the door or gate or positioned on a wall or fence near the door or gate. The computing device 430 can be positioned nearby and can communicate through a wireless interface with the light sensor 420 and a power locking mechanism in the door or gate that serves as an actuator 460. In some implementations, the secured device 450 can be a rifle and the light sensor 420 can be integrated with a scope attached to the rifle. The computing device 430 can be integrated in the butt of the rifle and can electronically connect to the light sensor 420 and a trigger or hammer locking mechanism that serves as an actuator 460. In some implementations, the secured device 450 can be a piece of rental equipment (e.g., a bicycle).

The computing device 430 can include a processing device 432 (e.g., as described in relation to FIG. 9) and a machine-readable repository, or database 434. In some implementations, the machine-readable repository can include flash memory. The machine-readable repository 434 can be used to store one or more reference records. A reference record can include data derived from one or more images of the white of an eye for a registered or authorized user of the secured device 450. In some implementations, the reference record includes complete reference images. In some implementations the reference record includes features extracted from the reference images. To create a reference record for a new user and enrollment or registration process can be carried out. An enrollment process can include the capture of one or more reference images of the white of a new registered user's eye. In some implementations, the enrollment process can be performed using the light sensor 420 and processing device 430 of authentication system 400.

Figure 5:
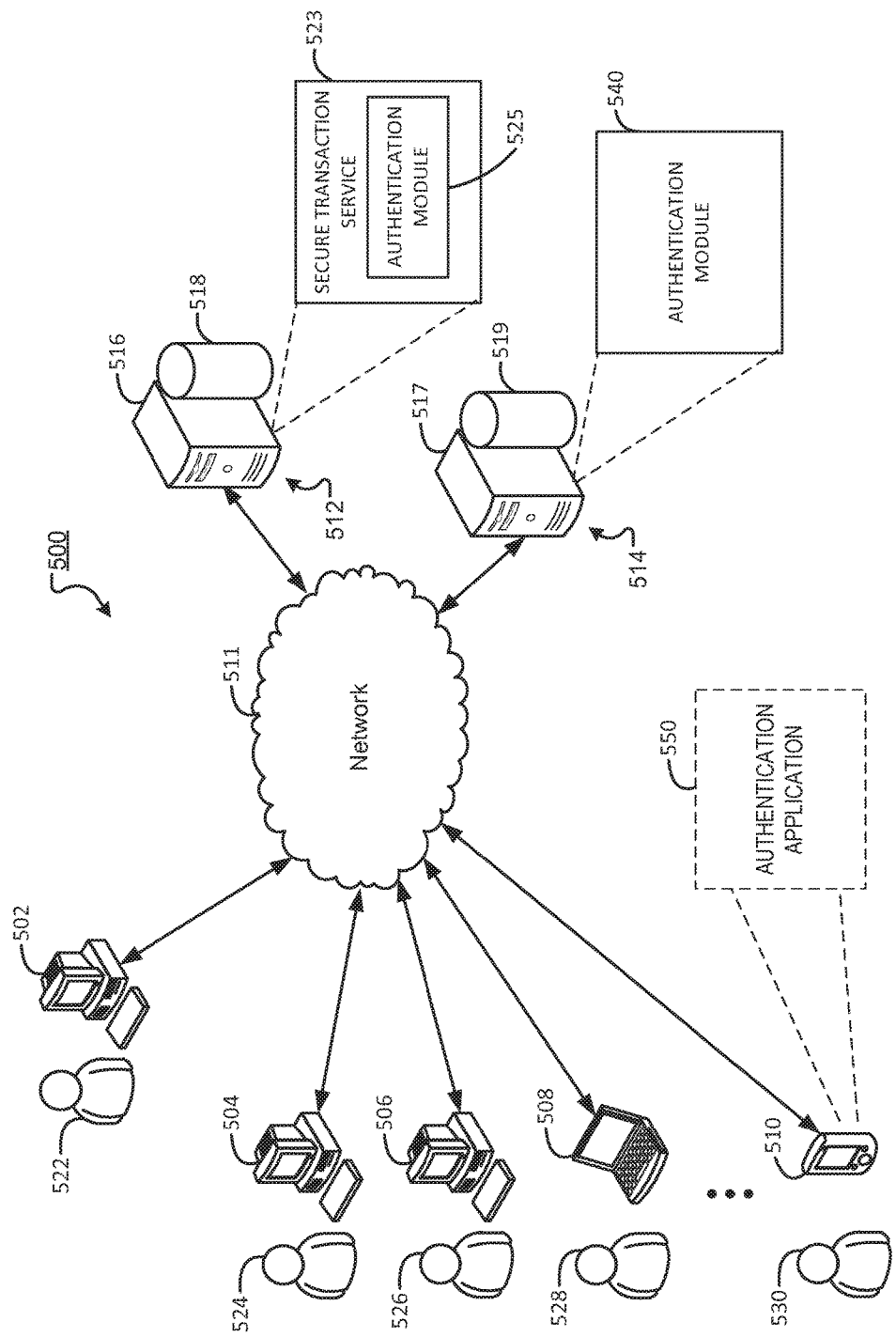
FIG. 5 is a block diagram of an example online environment.

FIG. 5 is a block diagram showing an example of a network environment 500 on which the techniques described herein can be implemented. Network environment 500 includes computing devices 502, 504, 506, 508, 510 that are configured to communicate with a first server system 512 and/or a second server system 514 over a network 511. Computing devices 502, 504, 506, 508, 510 have respective users 522, 524, 526, 528, 530 associated therewith. The first and second server systems 512, 514 each include a computing device 516, 517 and a machine-readable repository or database 518, 519. Example environment 500 can include many thousands of Web sites, computing devices and servers, which are not shown.

Network 511 can include a large computer network, examples of which include a local area network (LAN), wide area network (WAN), the Internet, a cellular network, or a combination thereof connecting a number of mobile computing devices, fixed computing devices, and server systems. The network(s) included in network 511 can provide for communications under various modes or protocols, examples of which include Transmission Control Protocol/Internet Protocol (TCP/IP), Global System for Mobile communication (GSM) voice calls, Short Electronic message Service (SMS), Enhanced Messaging Service (EMS), or Multimedia Messaging Service (MIMS) messaging, Ethernet, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. Communication can occur through a radio-frequency transceiver. In addition, short-range communication can occur, e.g., using a BLUETOOTH, WiFi, or other such transceiver system.

Computing devices 502, 504, 506, 508, 510 enable respective users 522, 524, 526, 528, 530 to access and to view documents, e.g., web pages included in web sites. For example, user 522 of computing device 502 can view a web page using a web browser. The web page can be provided to computing device 502 by server system 512, server system 514 or another server system (not shown).

In example environment 500, computing devices 502, 504, 506 are illustrated as desktop-type computing devices, computing device 508 is illustrated as a laptop-type computing device 508, and computing device 510 is illustrated as a mobile computing device. It is noted, however, that computing devices 502, 504, 506, 508, 510 can include, e.g., a desktop computer, a laptop computer, a handheld computer, a television with one or more processors embedded therein and/or coupled thereto, a tablet computing device, a personal digital assistant (PDA), a cellular telephone, a network appliance, a camera, a smart phone, an enhanced general packet radio service (EGPRS) mobile phone, a media player, a navigation device, an electronic messaging device, a game console, or a combination of two or more of these data processing devices or other appropriate data processing devices. In some implementations, a computing device can be included as part of a motor vehicle (e.g., an automobile, an emergency vehicle (e.g., fire truck, ambulance), a bus).

Users interacting with computing devices 502, 504, 506, 508, 510 can interact with a secure transaction service 523 hosted, e.g., by the server system 512, by authenticating themselves and issuing instructions or orders through the network 511. The secure transactions can include, e.g., e-commerce purchases, financial transactions (e.g., online banking transactions, credit or bank card transactions, loyalty reward points redemptions), or online voting. The secured transaction service can include an authentication module 525 that coordinates authentication of users from the secured server's side of the interaction. In some implementations, authentication module 525 can receive image data from a user device (e.g., computing devices 502, 504, 506, 508, 51 0) that includes one or more images of the eye of a user (e.g., users 522, 524, 526, 528, 530). The authentication module 525 can then process the image data to authenticate the user by determining if the image data matches a reference record for a recognized user identity that has been previously created based on image data collected during an enrollment session.

In some implementations, a user who has submitted a request for service can be redirected to an authentication module 540 that runs on separate server system 514. Authentication module 540 can maintain reference records for registered or enrolled users of the secure transaction service 523 and can also include reference records for users of other secure transaction services. Authentication module 540 can establish secure sessions with various secure transaction services (e.g., secure transaction service 523) using encrypted network communications (e.g., using a public key encryption protocol) to indicate to the secure transaction service whether the user has been authenticated as a registered or enrolled user. Much like authentication module 525, authentication module 540 can receive image data from the requesting user's computing device (e.g., computing devices 502, 504, 506, 508, 51 0) and can process the image data to authenticate the user. In some implementations, the authentication module can determine quality scores for images received from a user and can accept or reject the images based on the quality scores. When an image is rejected for being of low quality, the authentication module 540 can send network communication messages to provide a user with feedback to assist them in resubmitting a new image. In some implementations, the quality scores for images received from accepted authenticated users can be checked to select a new image or portion of a new image for use in updating the reference record for the registered or enrolled user.

Figure 9:
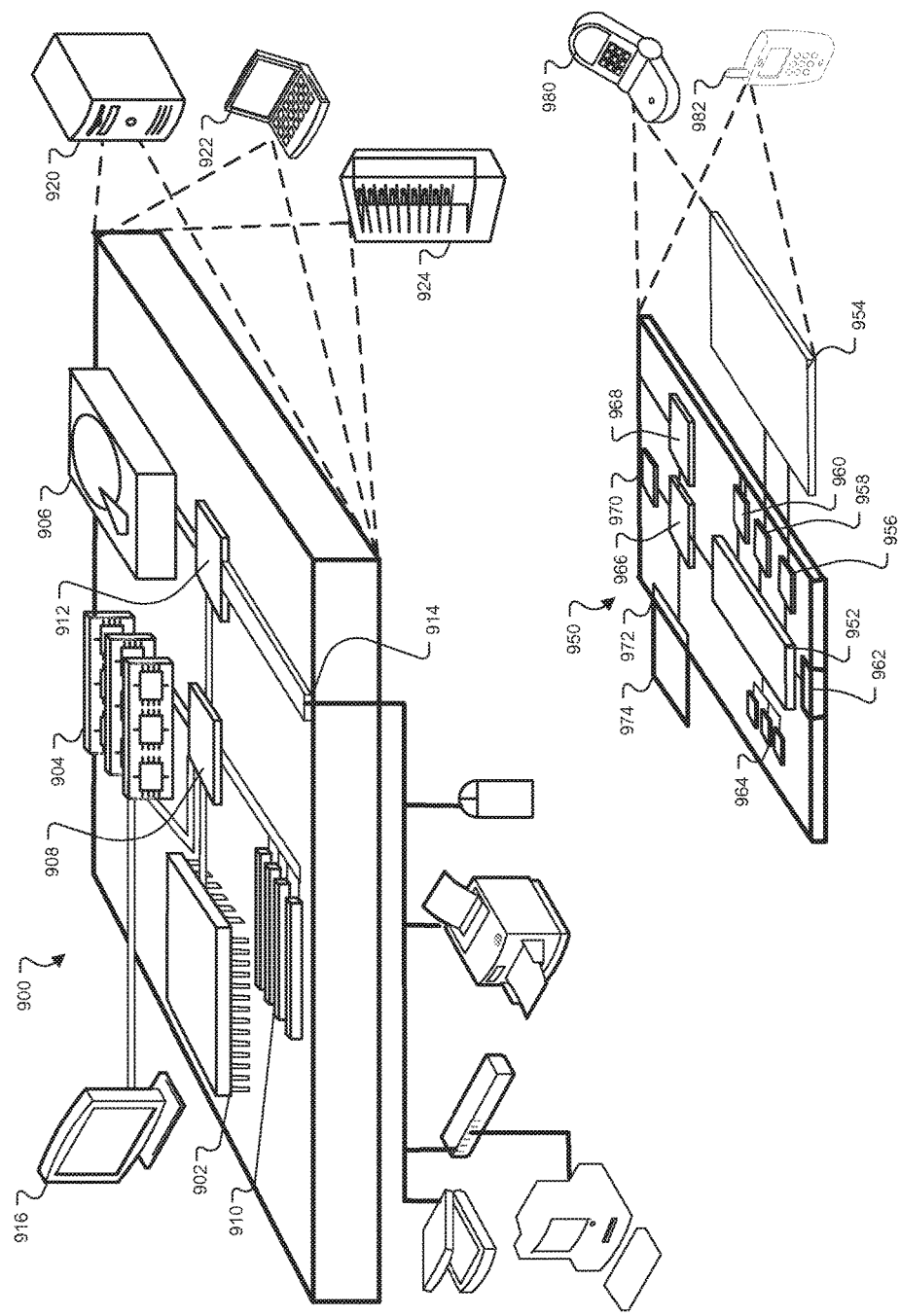
FIG. 9 shows an example of a computer device and a mobile computer device that can be used to implement the techniques described here.

The authentication module 540 can be implemented as software, hardware or a combination of software and hardware that is executed on a processing apparatus, such as one or more computing devices (e.g., a computer system as illustrated in FIG. 9).

A user device (e.g., computing device 51 0) can include an authentication application 550. The authentication application 550 can facilitate the authentication of the user as a registered or enrolled user identity for the purpose of accessing secured services (e.g., secure transaction service 523) through a network 511. For example, the authentication application 550 can be a mobile application or another type client application for interacting with a server-side authentication module (e.g., authentication module 540). The authentication application 550 can drive a sensor (e.g., a camera connected to or integrated with a user computing device) to capture one or more images of a user (e.g., user 530) that include views of the white of the user's eye. The authentication application 550 can prompt (e.g., through a display or speakers) the user to pose for image capture. For example, the user can be prompted to face the sensor and direct their gaze left or right to expose large portions of the white of an eye to the sensor.

In some implementations, the authentication application 550 transmits captured image data to an authentication module (e.g., authentication modules 525 or 540) on a remote server (e.g., server systems 512 or 514) through the network 511. The collection of image data from user can facilitate enrollment and the creation of a reference record for the user. The collection of image data from user can also facilitate authentication against a reference record for a user identity.

In some implementations, additional processing of the image data for authentication purposes can be performed by the authentication application 550 and the results of that processing can be transmitted to an authentication module (e.g., authentication modules 525 or 540). In this manner, the authentication functions can be distributed between the client and the server side processes in a manner suited a particular application. For example, in some implementations, the authentication application 550 determines quality scores for captured images and continues rejecting the images based on low quality scores and providing feedback to the user (e.g., through a display or a speaker) to prompt the user to collect additional images until one or more images of sufficient quality are obtained. At that point image data, based on the accepted images, can be transmitted to a server side authentication module (e.g., authentication modules 525 or 540) for further analysis.

In some implementations, the authentication application access a reference record for a user identity and conducts a full authentication process, before reporting the result (e.g., user accepted or rejected) to a server side authentication module.

The authentication application 550 can be implemented as software, hardware or a combination of software and hardware that is executed on a processing apparatus, such as one or more computing devices (e.g., a computer system as illustrated in FIG. 9).

Figure 6:
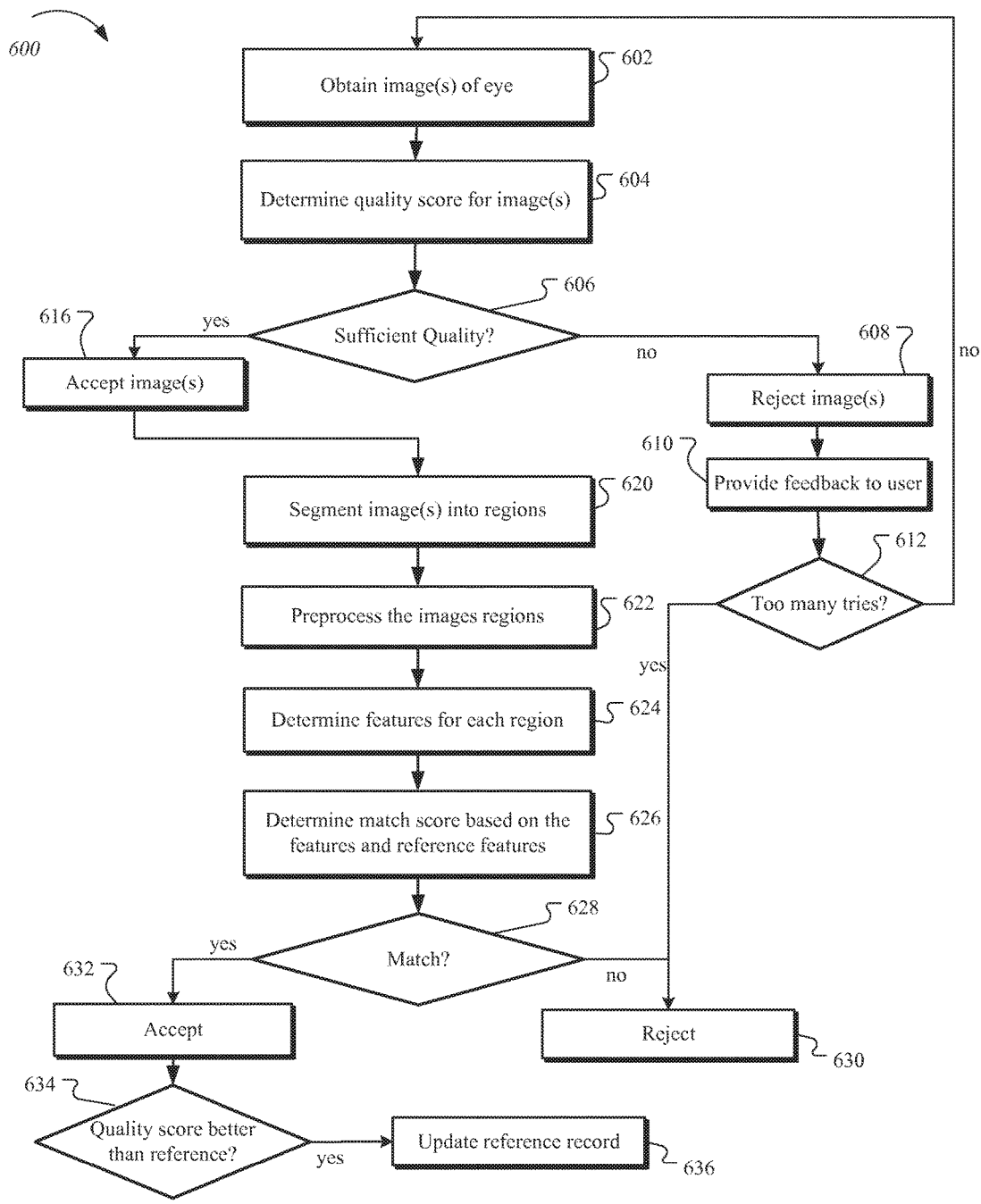
FIG. 6 is a flow chart of an example process for authenticating an individual based on one or more images of the white of an eye, where the quality of the obtained images for authentication is checked.

FIG. 6 is a flow chart of an example process 600 for authenticating an individual based on one or more images of the white of an eye. A quality score is determined for the obtained images and used to accept or reject the images. Once an image of sufficient quality is identified and accepted, the image is further analyzed to determine a match score by extracting features from the image and comparing the features to reference record. The user is then accepted or rejected based on the match score.

The process 600 can be implemented, for example, by the authentication module 440 in the computing device 430 of FIG. 4. In some implementations, the computing device 430 is a data processing apparatus that includes one or more processors that are configured to perform actions of the process 600. For example, the data processing apparatus can be a computing device (e.g., as illustrated in FIG. 9). In some implementations, process 600 can be implemented in whole or in part by the authentication application 550 that is executed by a user computing device (e.g., computing device 510). For example, the user computing device can be a mobile computing device (e.g., mobile computing device 950 of FIG. 9). In some implementations, process 600 can be implemented in whole or in part by the authentication module 540 that is executed by a user server system (e.g., server system 514). In some implementations, the server system 514 is a data processing apparatus that includes one or more processors that are configured to perform actions of the process 600. For example, the data processing apparatus can be a computing device (e.g., as illustrated in FIG. 9). In some implementations, a computer readable medium can include instructions that when executed by a computing device (e.g., a computer system) cause the device to perform actions of the process 600.

One or more images of an eye are obtained 602. The images include a view of a portion of a vasculature of the eye external to a corneal limbus boundary of the eye. The obtained images may be monochrome or represented in various color spaces (e.g., RGB, SRGB, HSV, HSL, or YCbCr). In some implementations, an image may be obtained using a light sensor (e.g., a digital camera, a 3D camera, or a light field sensor). The sensor may be sensitive to light in various ranges of wavelength. For example, the sensor may be sensitive to the visible spectrum of light. In some implementations, the sensor is paired with a flash or torch that can be pulsed to illuminate objects in view of the sensor. The capture of images can be synchronized or time-locked with pulsing of a flash. In some implementations, the sensor captures a sequence of images that can be used to track motion of objects within the field of view of the sensor. The sensor can include one more settings that control image capture (e.g., focus distance, flash intensity, exposure, and white balance). The images can collectively include a plurality of focus distances. For example, a sequence of images may be captured, each image captured with a different focus distance settings for the sensor and/or some sensors (e.g., a light field sensor) can capture an image that is focused at a plurality of distances from the sensor. In some implementations, the one or more images can be obtained 502 by reception through a network interface (e.g., a network interface of server system 514).

A quality score can then be determined 604 for the one or more images. In some implementations, the quality score is a prediction of a match score that would be determined based on the obtained image and a reference image, assuming the obtained image and the reference image included a view of the same person's vasculature. In some implementations, image data elements (e.g., a voxel, a pixel, a ray, or a red, green or blue channel value) are input directly to a trained function approximator that outputs a quality score. The function approximator can be trained using data corresponding to training images that match a reference image that is used to generate match scores for the training images using the same match scoring process that will be used to authenticate the user. The images match the reference record in the sense that they all include portions depicting the substantially similar views of the same vasculature of the white of a particular individual's eye. The function approximator models the mapping from input data (i.e., the training image data) to output data (i.e., the resulting match score) with a set of model parameters. The model parameter values are selected using a training algorithm that is applied to the data. For example, the function approximator can be based the following models: linear regression, Volterra series, Wiener series, radial basis functions, kernel methods, polynomial methods; piecewise linear models, neural networks, or fuzzy function approximator.

In some implementations, the quality score is determined 604 based on one or more quality metrics that in turn are determined based on the obtained images. Some examples of such a process are described in relation to FIG. 7.

For example, the quality score can be determined 604 by the authentication module 440, the authentication application 550, authentication module 525, or the authentication module 540.

The quality score is checked 606 to determine whether the quality of the one or more images is sufficient. In some implementations, the quality score can be compared to a threshold.

If the quality score is insufficient, the one or more images are rejected 608. In some implementations, the user can then be provided 610 with feedback that indicates that there was problem with the obtained images. The feedback can also give an indication as to the likely nature of the problem and thus facilitate an improved image capture from the user. For example, the feedback can indicate that the image is out of focus, or the lighting was poor. In some implementations, feedback is provided 610 through a display, speaker, or haptic feedback device. In some implementations, feedback is provided 610 by transmitting one or messages over a network using a network interface.

The number of attempts to obtain images can be checked 612 and, if too many (e.g., more than 3) attempts have been made, the user can be rejected 630. Otherwise, the user can be prompted to resubmit one or more new images as part of new attempt to obtain 602 one or more Images.

If the quality score is sufficient, the one or more images are accepted 616 and subjected to further analysis to complete the authentication process.

The one or more images may be segmented 620 to identify regions of interest that include the best views of vasculature in the white of an eye. In some implementations, anatomical landmarks (e.g., an iris, its center and corneal limbus boundary, eye corners, and the edges of eyelids) may be identified in the one or more images. Regions of interest within the image may be identified and selected based on their location in relation to the identified anatomical landmarks. For example, regions of interest may be located in the white of eye to the left, right, above, or below the iris. In some implementations, the selected regions of interest are tiled to form a grid covering a larger portion of the white of the eye. In some implementations, the selected regions of the image are noncontiguous (e.g., neighboring regions may overlap or neighboring regions may have space between them). The selected regions of interest may correspond to regions of interest selected from a reference image on which data in a reference record is based.

In some implementations, eye corners are found by fitting curves on the detected portions of the eyelid over sclera, and then extrapolating and finding the intersection of those curves. If one intersection (corner) cannot be found due to the fact that the iris was too close (e.g., due to gaze direction), then a template from the same corner area but from the opposite gaze direction photo can be derived and applied to the problematic corner neighborhood in the image at hand, and the maximum correlation location can be tagged as the corner.

In some implementations, eyelids are found by adaptive thresholding methods that find the white of the eye from the image, which border the eyelids. The sclera mask itself can be corrected by morphological operations (e.g., convex hull) to take out aberrations.

In some implementations, the limbic boundary is found from the sclera mask as where the sclera ends due to its termination at the iris limbic boundary.

In some implementations, the iris center is found through multiple methods. If the eye color is light, the center of the pupil can be found as the iris center. If the iris is too dark, then the center of the ellipsoid fitted to the limbic boundary and its center is found, or it is determined as the focal point of normal rays (i.e., lines perpendicular to tangents to the limbic boundary) converging around the iris center, or a combination of the above methods.

The image regions can be preprocessed 622 to enhance the view of a vasculature within an image. In some implementations, preprocessing 622 includes Color Image Enhancement and Contrast Limited Adaptive Histogram Equalization (CLARE) which enhances the contrast of the intensity image. CLARE operates in small regions of the image called tiles. Each tile's contrast is enhanced such that the histogram of the output approximately matches the histogram specified by uniform, exponential, or Rayleigh distributions. The neighboring tiles are then combined using bilinear interpolation to eliminate the artificially induced boundaries. In some implementations, the images can be enhanced by selecting one of the red, green or blue color components which has the best contrast between the vessels and the background. The green component can be preferred because it can provide the best contrast between vessels and background.

In some implementations, preprocessing 622 includes application of a multi-scale enhancement filtering scheme to enhance the intensity of the images thereby facilitating detection and subsequent extraction features of the vascular structure. The parameters of the filter can be determined empirically so as to account for variations in the girth of the blood vessels. The algorithm used can have good sensitivity, good specificity for curves and suppresses objects of other shapes. The algorithm can be based on the second derivatives of the image. First, since the second derivatives are sensitive to noise, an image segment is convolved with a Gaussian function. The parameter $\sigma$ of the Gaussian function can correspond to the thickness of a blood vessel. Next, for each image data element, a Hessian matrix can be built and eigenvalues $\lambda 1$ and $\lambda\text{-}2$ can be computed. In each Hessian matrix ridges are defined as points where the image has an extremum in the direction of the curvature. The direction of the curvature is the eigenvector of the second order derivatives of the image that corresponds to the largest absolute eigenvalue λ. The sign of the eigenvalue determines if it is a local minimum λ>O or maximum λ<O. The computed eigenvalues are then used to filter the blood vessel line with the equations:

$$I\_line(\lambda 1, \lambda 2) = |\lambda 1| - |\lambda 2| \text{ if } \lambda 1 < 0 \text{ and } I\_line(\lambda 1, \lambda 2) = 0 \text{ if } \lambda 1 \geq 0$$

The diameter of the blood vessels varies but the algorithm assumes the diameter is within an interval, [d0, d1]. Gaussian smoothing filters can be employed in the scale range of [d0/4, d1/4]. This filtering can be repeated N times based on the smoothing scales:

$$\sigma 1 = d0/4, \sigma 2 = r^*\sigma 1, \sigma 2 = r^2 {}^*\sigma 1, \ldots \sigma 2 = r^{\hat{}}(N-1) {}^*\sigma 1 = d1/4$$

This final output can be the maximum value from the output of all individual filters of N scales.

Features are determined 624 for each image region that reflect structure or properties of the vasculature visible in that region of the user's eye. In some implementations, minutia detection methods can be used to extract features of the user's vasculature. Examples of minutia detection processes are described in U.S. Pat. No. 7,327,860.

In some implementations, features may be determined 624 in part by applying a set of filters to the image regions that correspond to texture features of those image regions. For example, features may be determined in part by applying a set of complex Gabor filters at various angles to the image. The parameters of the filter can be determined empirically so as to account for variations in the spacing, orientation, and girth of the blood vessels. The texture features of an image can be measured as the amount of sharp visible vasculature in the region of interest. This quality can be determined with the ratio of area of sharp visible vasculature to the area of region of interest. The phase of Gabor filtered image, when binarized using a threshold, may facilitate detection and reveal sharp visible vasculature. The phase of complex Gabor filtered image reflects the vascular patterns at different angles when the Gabor filter kernel is configured with Sigma=2.5 Pixel, Frequency=6; and Gamma=1. The choice of frequency may be dependent on the distance between vessels, which in turn depends on the resolution and distance between image acquisition system and the subject. These parameters may be invariant to images. For example, the kernel parameters may be derived for eye images captured at a distance of 6-12 centimeters away from the eye using a particular sensor (e.g. a back camera on a smartphone) and the segmented sclera region can be resized to a resolution of (e.g., 401×501 pixels) for the analysis. Visible eye surface vasculature may be spread in all the directions on white of the eye. For example, the Gabor kernels may be aligned across six different angles (Angle=0, 30, 60, 90, 120, and 150 degrees). The phase of the Gabor-filtered images may vary from −n to +n radians. Phase values above 0.25 and below −0.25 radians may correspond to vascular structures. To binarize the phase image using thresholding, all values of phase above 0.25 or below −0.25 may be set to one and the remaining values to zero. This may result in a sharp vasculature structure in corresponding phase image. This operation can be performed for images resulting from applications of all six Gabor kernels at different angles. All the six binarized images may be added, to reveal a fine and crisp vascular structure. In some implementations, a vector of the elements of the binarized phase images may be used as a feature vector for comparing the image to a reference record. In some implementations, differences in textural features between image regions of interest may be used as a feature vector. The sum of all the 1's in a binarized image area divided by the area of region of interest may reflect the extent of the visible vasculature.

A match score is determined 626 based on the features and corresponding features from a reference record. The reference record can include data based at least in part on one or more reference images captured during an enrollment or registration process for a user. In some implementations, a match score can be determined 626 as a distance (e.g., a Euclidian distance, a correlation coefficient, modified Hausdorff distance, Mahalanobis distance, Bregman divergence, cosine similarity, Kullback-Leibler distance, and Jensen-Shannon divergence) between a vector of features extracted from the one or more obtained images and a vector of features from the reference record. In some implementations, the match score can be determined 626 by inputting features extracted from the one or more obtained images and features from the reference record to a trained function approximator.

In some implementations, a quality based fusion match score is determined 626 based on match scores for multiple images of the same vasculature. In some implementations, match scores for multiple images are combined by adding the match scores together in weighted linear combination with weights that respectively depended on quality scores determined for each of the multiple images. Other examples of techniques that can be used to combine match scores for multiple images based on their respective quality scores include hierarchical mixtures, sum rule, product rule, gated fusion, Dempster-Shafer combination, and stacked generalization, among others.

In some implementations, the match score is determined 626 by an authentication module (e.g., authentication module 440 running on computing device 430).

The match score can be checked 628 to determine whether there is a match between the one or more obtained images and the reference record. For example the match score can be compared to a threshold. A match can reflect a high likelihood that the user whose eye is depicted in the one or more obtained images is the same as an individual associated with the reference record.

If there is no match, then the user can be rejected 630. As a result, the user can be denied access to a secure device or service (e.g., secured device 450 or secure transaction service 523). In some implementations, the user can be informed of the rejection 630 through a message that is shown on a display or played through a speaker. In some implementations, the rejection can be affected by transmitting a message through a network reflecting the status of the user as rejected. For example, the authentication module 540, upon rejecting user 530 can transmit a rejection message to the secure transaction server 523 using a network interface of server system 514. The authentication module 540 can also send a rejection message to user computing device 510 in this scenario.

If there is a match, then the user can be accepted 632. As a result, the user can be granted access to a secure device or service (e.g., secured device 450 or secure transaction service 523). In some implementations, the user can be informed of the acceptance 630 through a message that is shown on a display or played through a speaker. In some implementations, the acceptance can be affected by transmitting a message through a network reflecting the status of the user as accepted. For example, the authentication module 540, upon accepting user 530 can transmit an acceptance message to the secure transaction server 523 using a network interface of server system 514. The authentication module 540 can also send an acceptance message to user computing device 510 in this scenario.

When a user has been accepted 632, it can be presumed that the user corresponds to the reference record. In some cases, the one or more obtained images or portions of those images used authenticate the user can have a superior quality level compared to a reference image, or portion thereof, from which the data in the reference record is derived. The reference record can include one or more quality scores for the one or more reference images from which the data in the reference record is derived. A quality score for the one or more obtained images can be compared 634 to a quality score from the reference record. If a new obtained image has a better quality score, then the reference record or a portion of the reference record can be updated 636 based on the new obtained image. For example, features extracted from the new obtained image or a portion of the new obtained image can be saved in the reference record to supplement or replace features that were previously saved in the reference record. In some implementations, the reference record is updated 636 by an authentication module (e.g., authentication module 440 running on computing device 430).

Figure 7:
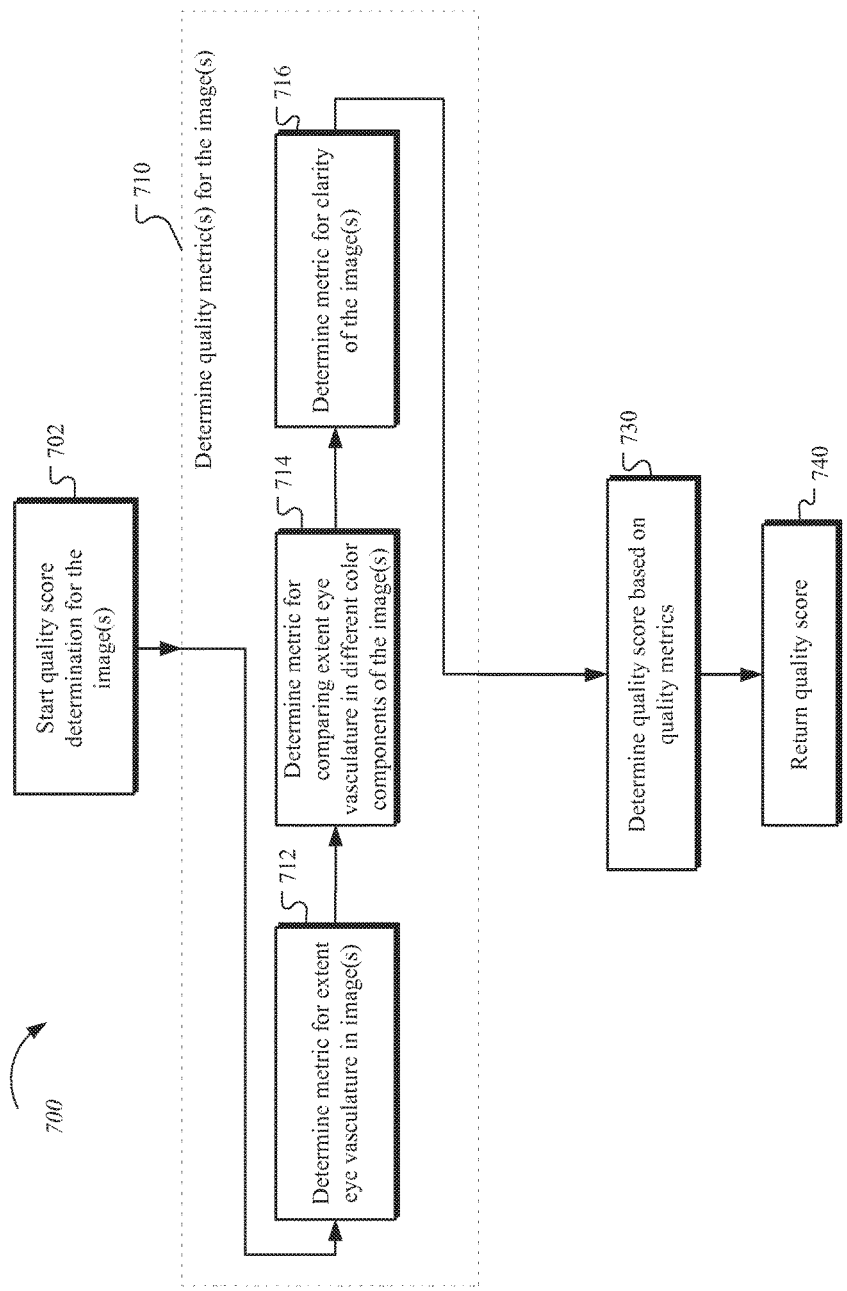
FIG. 7 is a flow chart of an example process for determining a quality score for one or more images of an eye.

FIG. 7 is a flow chart of an example process 700 for determining a quality score for one or more images of an eye. One or more quality metrics are determined 710 for the images and the quality score is determined 730 based on the one or more quality metrics.

The process 670 can be implemented, for example, by the authentication module 440 in the computing device 430 of FIG. 4. In some implementations, the computing device 430 is a data processing apparatus that includes one or more processors that are configured to perform actions of the process 700. For example, the data processing apparatus can be a computing device (e.g., as illustrated in FIG. 9). In some implementations, process 700 can be implemented in whole or in part by the authentication application 550 that is executed by a user computing device (e.g., computing device 510). For example, the user computing device can be a mobile computing device (e.g., mobile computing device 950 of FIG. 9). In some implementations, process 700 can be implemented in whole or in part by the authentication module 540 that is executed by a user server system (e.g., server system 514). In some implementations, the server system 514 is a data processing apparatus that includes one or more processors that are configured to perform actions of the process 700. For example, the data processing apparatus can be a computing device (e.g., as illustrated in FIG. 9). In some implementations, a computer readable medium can include instructions that when executed by a computing device (e.g., a computer system) cause the device to perform actions of the process 700.

Process 700 starts 702 when one or more images are received for processing. For example, the one or more images can be encoded as two, three, or four dimensional arrays of data image elements (e.g., a pixel, a voxel, a ray, or a red, green or blue channel value).

One or more quality metrics can then be determined 710 based on the one or more images. In this example, a metric for the extent of the vasculature detected in the one or more images is determined 712. In some implementations, a quality metric for the extent of the vasculature is determined 712 by first dilating vasculature and then thinning the vasculature appearing the one or more binarized images in order to connect portions of the vasculature that appear to be disconnected in the captured image. A portion of the image that contains the thinned dilated vasculature can then be determined. An example of this implementation is described in relation to FIG. 8.

A quality metric for comparing the extent of eye vasculature detected across different color components in the first image can be determined 714. In some implementations, this quality metric is determined 714 by separating the one or more images into three color components (e.g., red, green, and blue), determining difference signals based on pairs of the color components, determining the standard deviations of the difference signals, and determining a ration between the standard deviations. For example, this quality metric can be determined 714 in accordance with the following equation:

$$QM\_2 = SD(R-G)/SD(G-B)$$

where QM 2 is the quality metric, SD is a standard deviation operator that calculates the standard deviation of the elements of its matrix argument, G is a matrix of pixel values for a first color component (e.g., green) of an image, R is a matrix of pixel values for a second color component (e.g., red) of an image, and B is a matrix of pixel values for a third color component (e.g., blue) of an image. For example, this quality metric can be determined 714 by an authentication module or application (e.g., authentication module 440).

A quality metric that reflects image clarity can be determined 716. In some implementations, this quality metric can be based on one or more of the following measures for the one or more images: contrast, defocus, motion blur, exposure, dynamic range, and chromatic differences. For example, this quality metric can be determined 716 by an authentication module or application (e.g., authentication module 440).

In some implementations, not shown, a quality metric can be determined based on the amount of glare in the one or more images. In some implementations, not shown, a quality metric can be determined based on the number and types of occlusions in the one or more images. For example, occlusions can include eyelashes that block the view of the white of an eye, dust or other debris obstructing the sensor, etc. In some implementations, not shown, a quality metric can be determined based on the amount of specular reflection in the one or more images. In some implementations, not shown, a quality metric can be determined based on a degree to which an eyelid is closed over an eye depicted in the one or more images. In some implementations, not shown, a quality metric can be determined based on a gaze angle of an eye depicted in the one or more images. In some implementations, not shown, a quality metric can be determined based on the segmentation quality of a sclera depicted in the one or more images. For example, an image in which the iris is centered may not expose as large an area of the white of an eye as an image in which the iris is rolled off center. Certain regions of interest can be visible in some poses, but not in others. Thus images of eyes in certain poses can have better quality than other poses for the purpose of match score determination and authentication. This example metric can reflect these differences in segmentation quality that would result from the pose or other factors. Segmentation quality is how well and tightly the white of the eye could be separated from it surrounding structure to trace the exposed white of the eye and extract only that part of the image without getting any eyelash, iris, and eyelid in. For example, this quality metric can be a count of the number of regions of interest exposed in the one or more images.

The quality score can then be determined 730 based on the one or more quality metrics. In some implementations, the quality score is weighted combination of the quality metrics. In some implementations, the quality score is determined by inputting the one or more quality metrics to a trained function approximator that outputs a prediction of a match score that would be determined based on the one or more obtained images and a hypothetical reference image, assuming the one or more obtained images and the hypothetical image included a view of the same vasculature.

The function approximator can be trained using data corresponding to training images that match a reference image that is used to generate match scores for the training images using the same match scoring process that will be used to authenticate the user. The images match the reference record in the sense that they all include portions depicting the same vasculature of the white of a particular individual's eye. The function approximator models the mapping from input data (i.e., the training image quality metrics) to output data (i.e., the resulting match score for genuine users) with a set of model parameters. The model parameter values are selected using a training algorithm that is applied to the training data. For example, the function approximator can be based the following models: linear regression, Volterra series, Wiener series, kernel methods, radial basis functions, polynomial methods; piecewise linear models, neural networks, or fuzzy function approximator.

For example, the quality score can be determined 730 based on one or more quality metrics by an authentication module or application (e.g., authentication module 440).

The resulting quality score can then be returned 740 and can be used by an authentication system (e.g., authentication system 400) in variety of ways. For example, the quality score can be used to accept or reject the one or more images, to combine match scores for multiple images into a quality based fused match score, or to select new images for updating a reference record.

Figure 8:
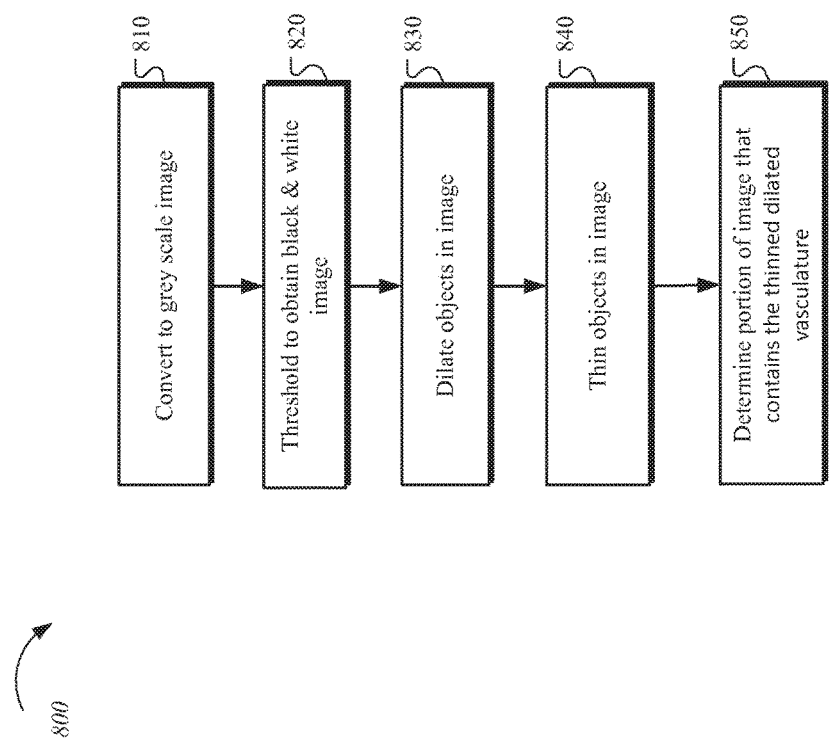
FIG. 8 is a flow chart of an example process for determining a metric for the extent of vasculature shown in an image of an eye.

FIG. 8 is a flow chart of an example process 800 for determining a metric for the extent of vasculature shown in an image of an eye. The image can be converted 810 to a grey scale image. For example, a single color component (e.g., green or luminance) can be selected as the grey scale image. The grey scale image can be thresholded 820 to obtain a black and white image. The threshold used can be fixed or determined based on statistics of the set of pixels in the grey scale image.

The objects in the black and white image can be dilated 830. Dilation 830 can be accomplished by filling in white pixels in proximity to black pixels with black pixels. The dilation operation can be performed multiple times (e.g. three times) to fill in holes in the connected vasculature structure caused by noise in the image signal. Next, the objects in the image can be thinned 840 by removing black pixels in proximity to white pixels. The thinning 840 operation can be repeated multiple times (e.g., three times). The thinning 840 operation can be repeated the same number of times that the dilation operation was repeated.

A portion of the image that contains the thinned dilated vasculature can then be determined 850. This portion can reflect the extent of the connected vasculature shown in the image. For example, the portion can be determined 850 as a ratio of the number of black pixels in the image to the number of white pixels in the image.

For example, the process 800 can be implemented by an authentication module or application (e.g., authentication module 440).

FIG. 9 shows an example of a generic computer device 900 and a generic mobile computing device 950, which can be used with the techniques described here. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and can be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses can be used, as appropriate, along with multiple memories and types of memory. Also, multiple computing devices 900 can be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 can also be another form of computer-readable medium, such as a magnetic or optical disk.

The storage device 906 is capable of providing mass storage for the computing device 900. In one implementation, the storage device 906 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The information carrier is a computer- or machine-readable medium, such as the memory 904, the storage device 906, or a memory on processor 902, for example.

The high speed controller 908 manages bandwidth-intensive operations for the computing device 900, while the low speed controller 912 manages lower bandwidth intensive operations. Such allocation of functions is exemplary only. In one implementation, the high-speed controller 908 is coupled to memory 904, display 916 (e.g., through a graphics processor or accelerator), and to high-speed expansion ports 910, which can accept various expansion cards (not shown). In the implementation, low-speed controller 912 is coupled to storage device 906 and low-speed expansion port 914. The low-speed expansion port, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 900 can be implemented in a number of different forms, as shown in the figure. For example, it can be implemented as a standard server 920, or multiple times in a group of such servers. It can also be implemented as part of a rack server system 924. In addition, it can be implemented in a personal computer such as a laptop computer 922. Alternatively, components from computing device 900 can be combined with other components in a mobile device (not shown), such as device 950. Each of such devices can contain one or more of computing device 900, 950, and an entire system can be made up of multiple computing devices 900, 950 communicating with each other.

Computing device 950 includes a processor 952, memory 964, an input/output device such as a display 954, a communication interface 966, and a transceiver 968, among other components. The device 950 can also be provided with a storage device, such as a microdrive or other device, to provide additional storage. Each of the components 950, 952, 964, 954, 966, and 968, are interconnected using various buses, and several of the components can be mounted on a common motherboard or in other manners as appropriate.

The processor 952 can execute instructions within the computing device 950, including instructions stored in the memory 964. The processor can be implemented as a chipset of chips that include separate and multiple analog and digital processors. The processor can provide, for example, for coordination of the other components of the device 950, such as control of user interfaces, applications run by device 950, and wireless communication by device 950.

Processor 952 can communicate with a user through control interface 958 and display interface 956 coupled to a display 954. The display 954 can be, for example, a TFT LCD (Thin-Film-Transistor Liquid Crystal Display) or an OLED (Organic Light Emitting Diode) display, or other appropriate display technology. The display interface 956 can comprise appropriate circuitry for driving the display 954 to present graphical and other information to a user. The control interface 958 can receive commands from a user and convert them for submission to the processor 952. In addition, an external interface 962 can be provided in communication with processor 952, so as to enable near area communication of device 950 with other devices. External interface 962 can provide, for example, for wired communication in some implementations, or for wireless communication in other implementations, and multiple interfaces can also be used.

The memory 964 stores information within the computing device 950. The memory 964 can be implemented as one or more of a computer-readable medium or media, a volatile memory unit or units, or a non-volatile memory unit or units. Expansion memory 974 can also be provided and connected to device 950 through expansion interface 972, which can include, for example, a SIMM (Single In Line Memory Module) card interface. Such expansion memory 974 can provide extra storage space for device 950, or can also store applications or other information for device 950. Specifically, expansion memory 974 can include instructions to carry out or supplement the processes described above, and can include secure information also. Thus, for example, expansion memory 974 can be provided as a security module for device 950, and can be programmed with instructions that permit secure use of device 950. In addition, secure applications can be provided via the SIMM cards, along with additional information, such as placing identifying information on the SIMM card in a non-hackable manner.

The memory can include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, memory on processor 952, or a propagated signal that can be received, for example, over transceiver 968 or external interface 962.

Device 950 can communicate wirelessly through communication interface 966, which can include digital signal processing circuitry where necessary. Communication interface 966 can provide for communications under various modes or protocols, such as GSM voice calls, SMS, EMS, or MMS messaging, CDMA, TDMA, PDC, WCDMA, CDMA2000, or GPRS, among others. Such communication can occur, for example, through radio-frequency transceiver 968. In addition, short-range communication can occur, such as using a Bluetooth, WiFi, or other such transceiver (not shown). In addition, GPS (Global Positioning System) receiver module 970 can provide additional navigation- and location-related wireless data to device 950, which can be used as appropriate by applications running on device 950.

Device 950 can also communicate audibly using audio codec 960, which can receive spoken information from a user and convert it to usable digital information. Audio codec 960 can likewise generate audible sound for a user, such as through a speaker, e.g., in a handset of device 950. Such sound can include sound from voice telephone calls, can include recorded sound (e.g., voice messages, music files, etc.) and can also include sound generated by applications operating on device 950.

The computing device 950 can be implemented in a number of different forms, as shown in the figure. For example, it can be implemented as a cellular telephone 980. It can also be implemented as part of a smartphone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications can be made without departing from the spirit and scope of the invention.

In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

What is claimed is:

1. A computer-implemented method for determining a biometric score, the method comprising:
    receiving at least one image of an eye, the at least one image comprising a view of vasculature of the eye;
    determining at least one metric for the at least one image, the at least one metric comprising a first metric representing an extent of detected vasculature in the at least one image based on a plurality of color difference signals determined from color components of the at least one image; and
    calculating at least one score for the at least one image based at least in part on a comparison of the first metric with a corresponding metric of a reference image.

2. The method of claim 1:
    wherein receiving the at least one image comprises receiving a plurality of images of the eye;
    wherein determining the at least one metric for the at least one image comprises determining at least one respective metric for each of the images; and
    wherein calculating the at least one score for the at least one image comprises calculating a respective score for each of the images.

3. The method of claim 2, wherein the respective scores comprise respective first scores, the method further comprising calculating a second score based at least in part on a combination of the first scores.

4. The method of claim 3, further comprising granting a user access to a device or a service based on the second score.

5. The method of claim 3, further comprising determining a quality score for a particular one of the images based on at least one metric determined for the particular image, wherein the quality score is a prediction of the second score assuming both the particular image and the reference image include a view of vasculature of a same eye.

6. The method of claim 5, further comprising accepting or rejecting the particular image based on the quality score.

7. The method of claim 3, wherein calculating the second score based at least in part on the combination of the first scores comprises:
    determining a respective weight for each of the first scores; and
    combining the first scores weighted by their respective weights to determine the second score.

8. The method of claim 1, wherein calculating the at least one score for the at least one image comprises calculating a distance between at least one metric determined for the at least one image and at least one corresponding metric of the reference image.

9. The method of claim 1, wherein determining the first metric comprises:
    determining a first color difference signal by subtracting a first color component of the at least one image from a second color component of the at least one image;
    determining a second color difference signal by subtracting a third color component of the at least one image from the first color component of the at least one image; and
    calculating a ratio of a first standard deviation of the first color difference signal to a second standard deviation of the second color difference signal to determine the first metric.

10. The method of claim 1, wherein the at least one metric further comprises a second metric, and wherein the at least one score is calculated based at least in part on a comparison of the first and second metrics of the at least one image with corresponding metrics of the reference image.

11. The method of claim 10, wherein determining the second metric for the at least one image comprises:
    dilating vasculature in the at least one image so that one or more disconnected veins become connected;
    thinning the dilated vasculature; and
    identifying a portion of the at least one image containing the thinned dilated vasculature.

12. The method of claim 10, wherein the second metric represents a calculated area of one or more connected structures of vasculature in the at least one image.

13. The method of claim 10, wherein the second metric is based on an amount of specular reflection in the at least one image, an amount of glare in the at least one image, a number and types of occlusions in the at least one image, a gaze angle of the eye depicted in the at least one image, or segmentation quality of a sclera depicted in the at least one image.

14. A system comprising:
at least one memory for storing computer-executable instructions; and
at least one processor for executing the instructions stored on the memory, wherein execution of the instructions programs the at least one processor to perform operations comprising:
receiving at least one image of an eye, the at least one image comprising a view of vasculature of the eye;
determining at least one metric for the at least one image, the at least one metric comprising a first metric representing an extent of detected vasculature in the at least one image based on a plurality of color difference signals determined from color components of the at least one image; and
calculating at least one score for the at least one image based at least in part on a comparison of the first metric with a corresponding metric of a reference image.

15. The system of claim 14:
wherein receiving the at least one image comprises receiving a plurality of images of the eye;
wherein determining the at least one metric for the at least one image comprises determining at least one respective metric for each of the images; and
wherein calculating the at least one score for the at least one image comprises calculating a respective score for each of the images.

16. The system of claim 15, wherein the respective scores comprise respective first scores, the method further comprising calculating a second score based at least in part on a combination of the first scores.

17. The system of claim 16, wherein the operations further comprise granting a user access to a device or a service based on the second score.

18. The system of claim 16, wherein the operations further comprise determining a quality score for a particular one of the images based on at least one metric determined for the particular image, wherein the quality score is a prediction of the second score assuming both the particular image and the reference image include a view of vasculature of a same eye.

19. The system of claim 18, wherein the operations further comprise accepting or rejecting the particular image based on the quality score.

20. The system of claim 16, wherein calculating the second score based at least in part on the combination of the first scores comprises:
determining a respective weight for each of the first scores; and
combining the first scores weighted by their respective weights to determine the second score.

21. The system of claim 14, wherein calculating the at least one score for the at least one image comprises calculating a distance between at least one metric determined for the at least one image and at least one corresponding metric of the reference image.

22. The system of claim 14, wherein determining the first metric comprises:
determining a first color difference signal by subtracting a first color component of the at least one image from a second color component of the at least one image;
determining a second color difference signal by subtracting a third color component of the at least one image from the first color component of the at least one image; and
calculating a ratio of a first standard deviation of the first color difference signal to a second standard deviation of the second color difference signal to determine the first metric.

23. The system of claim 14, wherein the at least one metric further comprises a second metric, and wherein the at least one score is calculated based at least in part on a comparison of the first and second metrics of the at least one image with corresponding metrics of the reference image.

24. The system of claim 13, wherein determining the second metric for the at least one image comprises:
dilating vasculature in the at least one image so that one or more disconnected veins become connected;
thinning the dilated vasculature; and
identifying a portion of the at least one image containing the thinned dilated vasculature.

25. The system of claim 23, wherein the second metric represents a calculated area of one or more connected structures of vasculature in the at least one image.

26. The system of claim 23, wherein the second metric is based on an amount of specular reflection in the at least one image, an amount of glare in the at least one image, a number and types of occlusions in the at least one image, a gaze angle of the eye depicted in the at least one image, or segmentation quality of a sclera depicted in the at least one image.

27. A non-transitory computer-readable storage medium having instructions stored thereon that, when executed by data processing apparatus, cause the data processing apparatus to perform operations comprising:
receiving at least one image of an eye, the at least one image comprising a view of vasculature of the eye;
determining at least one metric for the at least one image, the at least one metric comprising a first metric representing an extent of detected vasculature in the at least one image based on a plurality of color difference signals determined from color components of the at least one image; and
calculating at least one score for the at least one image based at least in part on a comparison of the first metric with a corresponding metric of a reference image.

* * * * *